Oct. 12, 1937.  W. E. SIMONSON  2,095,455

MEANS FOR CONDITIONING FRUITS AND VEGETABLES

Filed April 30, 1934  5 Sheets-Sheet 1

Inventor
Walker E. Simonson
By Jack A. Ashley
Attorney

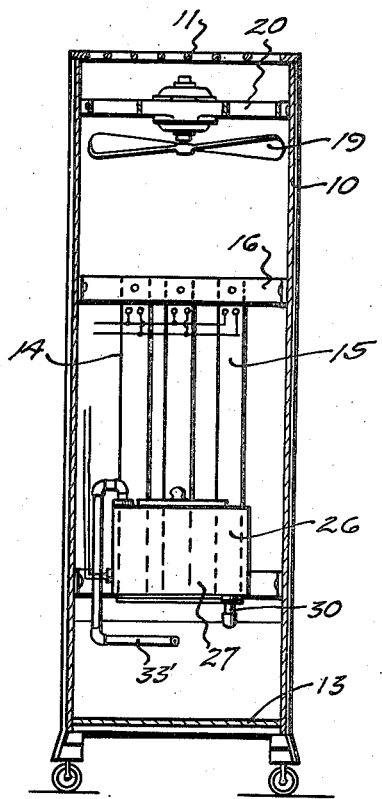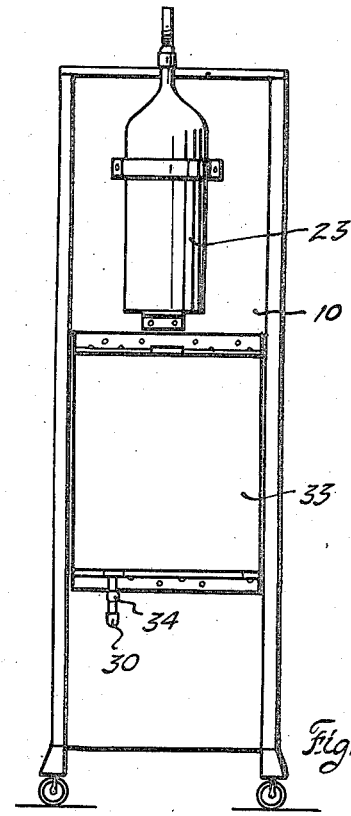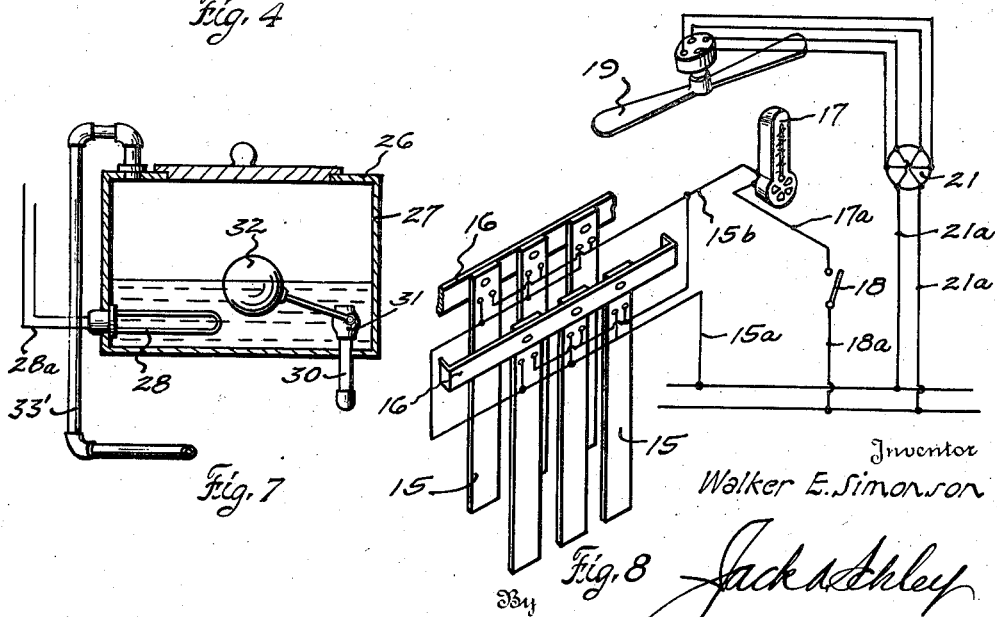

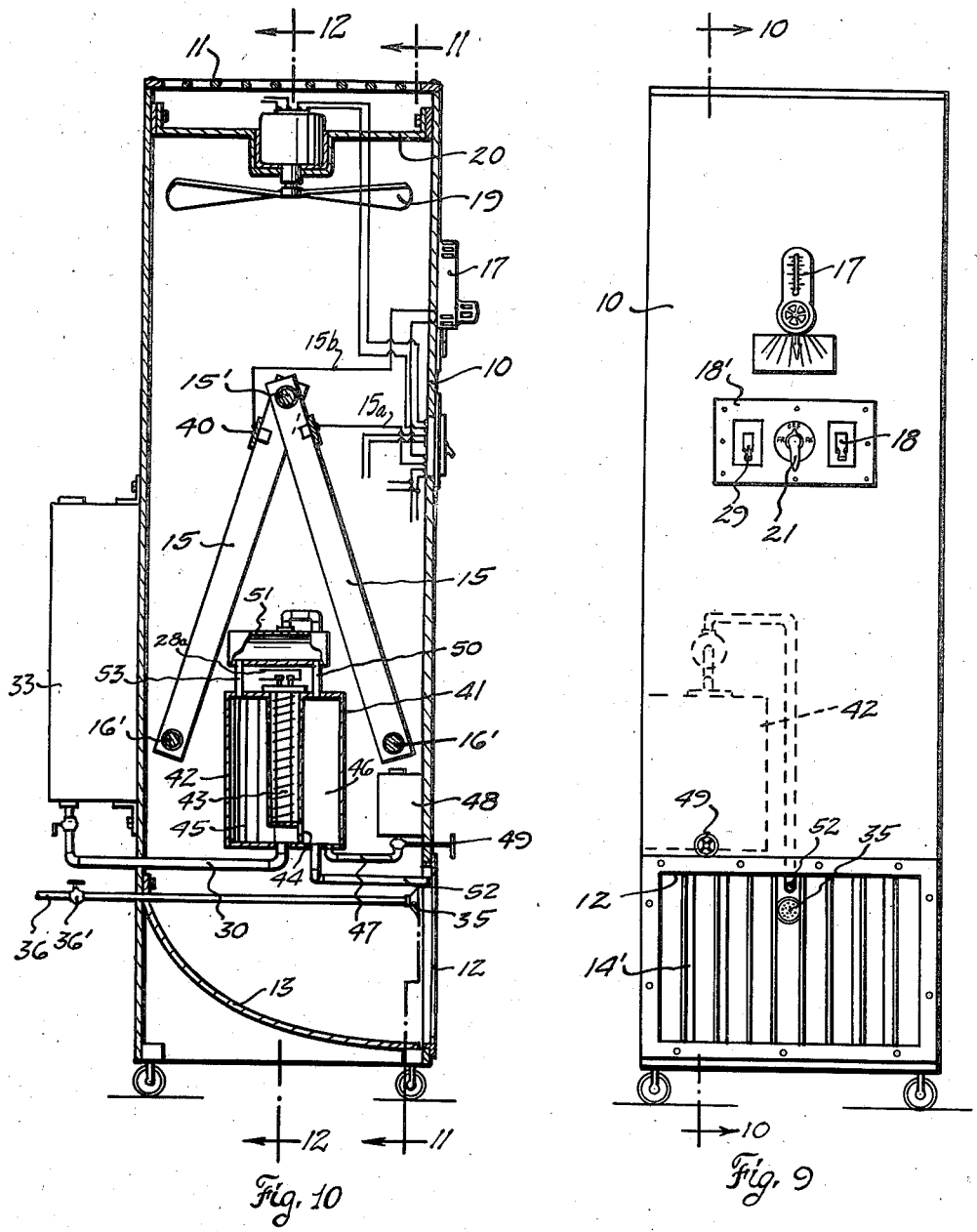

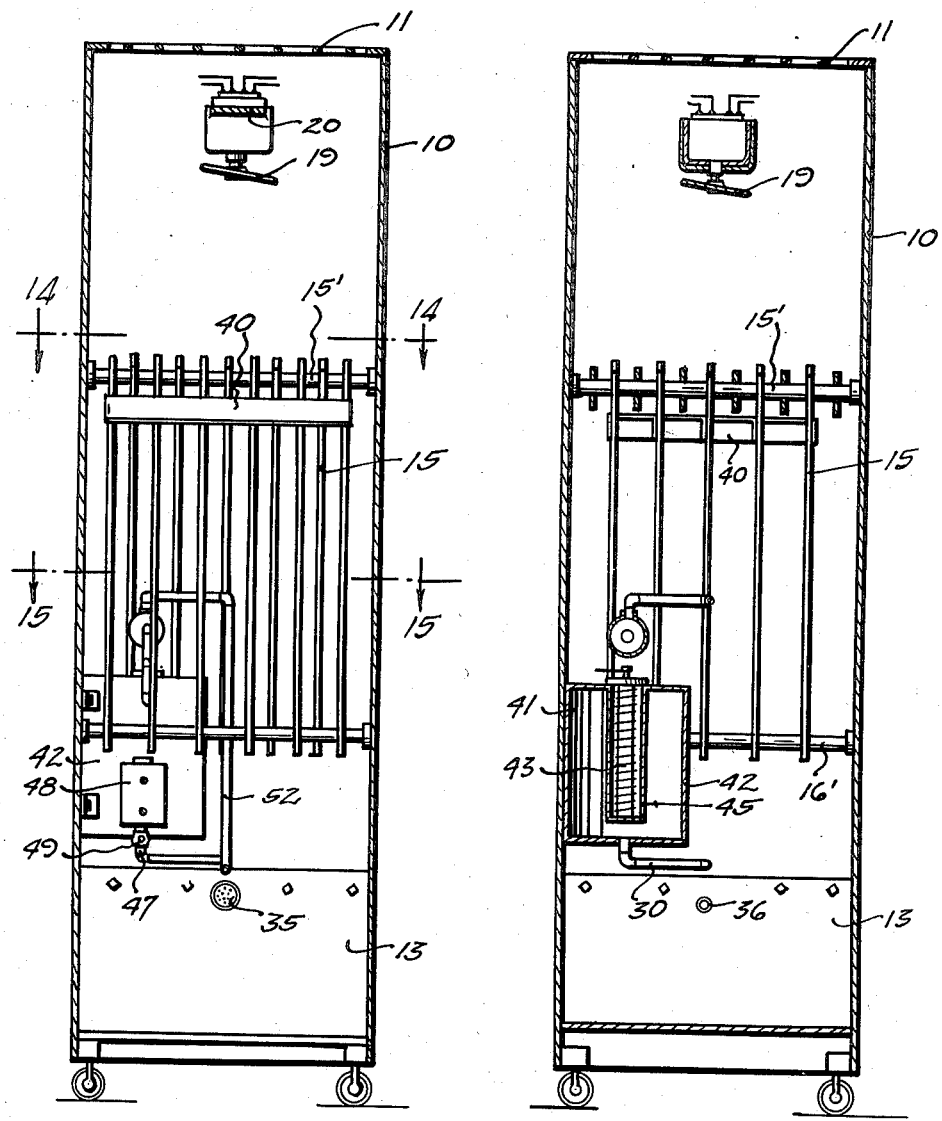

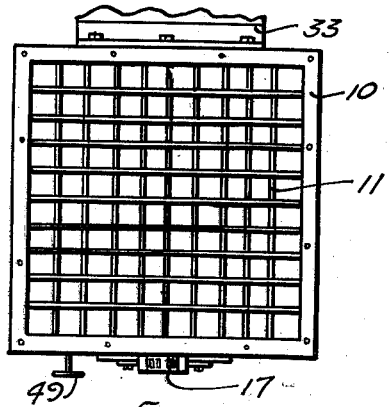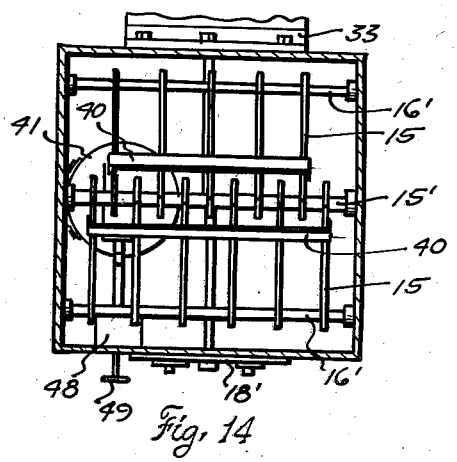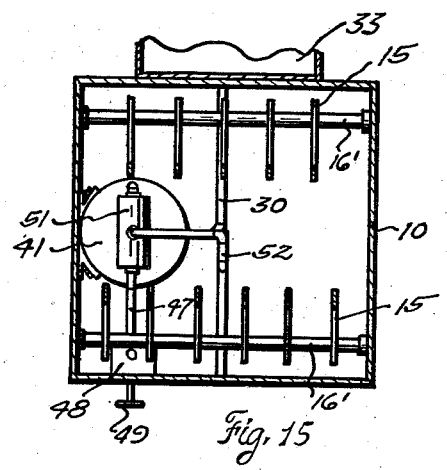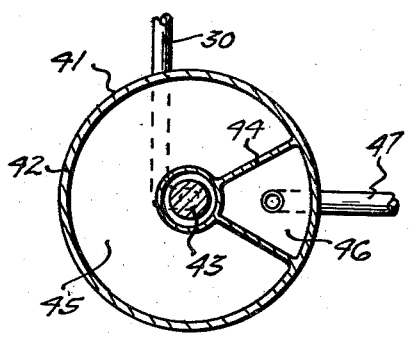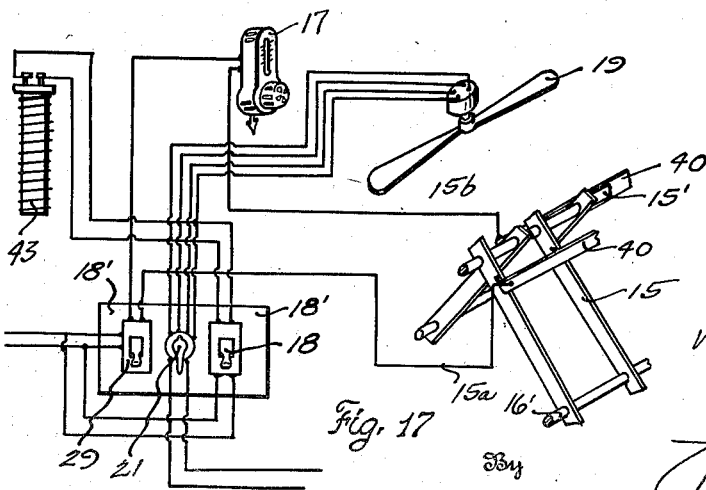

Patented Oct. 12, 1937

2,095,455

UNITED STATES PATENT OFFICE 2,095,455

MEANS FOR CONDITIONING FRUITS AND VEGETABLES

Walker E. Simonson, Bartlesville, Okla., assignor to The Simolene Company, Bartlesville, Okla.

Application April 30, 1934, Serial No. 723,139

2 Claims. (Cl. 99—271)

This invention relates to new and useful improvements in means for conditioning fruits and vegetables.

One object of the invention is to provide improved means for conditioning and treating fruits and vegetables.

Another object of the invention is to provide improved means for controlling the humidity, temperature and circulation of gas and air in a room or enclosure wherein fruits and vegetables are stored for conditioning, whereby the ripening or coloring of a particular fruit or vegetable may be hastened or retarded.

An important object of the invention is to provide an improved method of conditioning fruits and vegetables which consists in storing the fruit or vegetable in an air tight enclosure, releasing a suitable gas into the enclosure, and controlling the temperature and humidity of the air and circulation of the air and gas within the enclosure so as to properly ripen and color the particular fruit or vegetable therein.

A further object of the invention is to provide an improved machine for conditioning fruits and vegetables including means for automatically controlling the temperature and humidity of the enclosure wherein the fruits and vegetables are stored, and having means for releasing a suitable conditioning gas within the enclosure, and also having means for circulating said gas and the air within the enclosure whereby the conditioning of said fruits and vegetables is positively controlled.

An important object of the invention is to provide an improved machine for conditioning fruits and vegetables including means for automatically controlling the temperature and humidity of the enclosure wherein the fruits or vegetables are stored, and having means for generating a gas suitable for the conditioning of said fruits and vegetables, and also having means for circulating said gas and the air within the enclosure, whereby the conditioning of said fruits and vegetables is positively controlled.

Another object of the invention is to provide improved means for generating a gas suitable for the conditioning of fruits and vegetables.

A construction designed to carry out the invention will be hereinafter described, together with other features of the invention.

The invention will be more readily understood from a reading of the following specification and by reference to the accompanying drawings, in which an example of the invention is shown, and wherein:

Figure 4 is a view, similar to Figure 3, and taken at a right angle thereto.

Figure 5 is a rear elevation of the machine.

Figure 7 is a vertical sectional view of the steam generator.

Figure 8 is schematic view of the heating strips and their electrical connections.

Figure 9 is a front elevation of another form of the invention.

Figure 10 is a transverse vertical sectional view, taken on the line 10—10 of Figure 9.

Figure 11 is a transverse vertical sectional view, taken on the line 11—11 of Figure 10.

Figure 12 is a transverse vertical sectional view, taken on the line 12—12 of Figure 10.

Figure 13 is a plan view.

Figure 14 is a horizontal cross sectional view, taken on the line 14—14 of Figure 11.

Figure 15 is a horizontal cross sectional view, taken on the line 15—15 of Figure 11.

Figure 16 is a horizontal cross sectional view of the generator, and,

Figure 17 is a wiring diagram of the electrical hookup.

Figure 1:
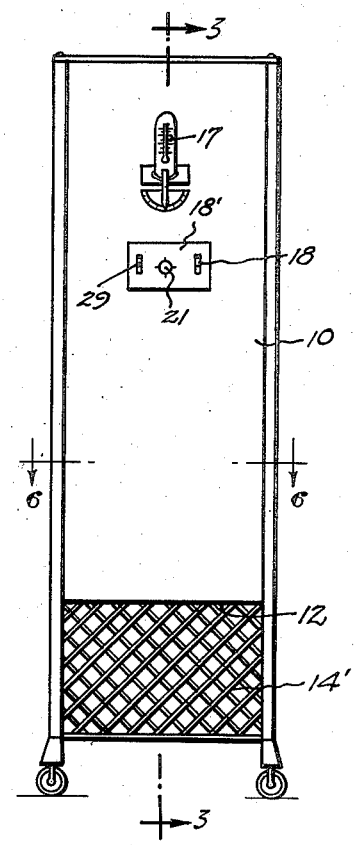
Figure 1 is a front elevation of a conditioning machine, constructed in accordance with the invention.

In the drawings, the numeral 10 designates an upright case or cabinet which is preferably square in cross section, altho this is not essential. The cabinet has its top open and a suitable grille 11 extends thereacross. The front wall of the cabinet terminates short of the lower end of said cabinet, thereby providing an opening 12 at the lower end of said front wall which extends entirely across the width of the cabinet. The cabinet is provided with a false bottom 13 which curves forwardly and downwardly and terminates at the lower end of the opening 12, which is covered by a suitable grating 14'. It is obvious that air entering the cabinet thru the open top and passing downwardly thru said cabinet is directed outwardly thru the opening 12 by the curved bottom 13.

For controlling the temperature of the enclosure or room wherein the cabinet 10 may be, a suitable heating unit 14 is provided. The unit includes a plurality of metal heating strips 15 which are positioned vertically within the cabinet near the front and rear walls thereof. The upper and lower ends of the strips are fastened to transverse supporting bars 16 which are secured to the sides of the cabinet. By observing Figure 3, it will be seen that air passing thru the cabinet must pass between the metal strips. The strips are electrically connected to each other by wires 15a and 15b, the former having its other end secured to the positive side of the source of supply. The wire 15b has its other end connected to a thermostat 17 which is mounted on the front wall of the cabinet near the upper end thereof.

The thermostat is electrically connected by a wire 17a with a suitable switch 18 mounted in a switch panel 18' in the front wall of the cabinet. A lead wire 18a connected to the switch has its other end connected to the negative side of the source of supply. It is obvious when the switch is closed, the current flows thru the wire 15a, to the strips 15, thru the thermostat 17 and switch 18 and the circuit is completed thru the lead wire 18a. So long as the switch 18 is closed, the current is flowing thru the strips energizing the same. By connecting the thermostat in the heating strip circuit, it is possible to positively control the electrical current to the strips and thereby control the heat of the enclosure in which the cabinet is positioned.

For circulating the air in the enclosure wherein the cabinet is positioned an electric fan 19 is mounted in a suitable bracket 20 in the top of the cabinet. The fan is connected in series with a triple pole double throw switch 21 which is mounted in the panel 18' on the front of the cabinet. The switch 21 is connected by lead wires 21a with a suitable source of supply. The fan carries a propeller type blade and due to the hookup is reversible. When operated in a forward direction, it pulls the air in thru the top of the cabinet and forces it downwardly therethrough, and outwardly thru the opening 12 in the front wall of said cabinet. When the fan is reversed air is drawn upwardly through the cabinet and forced out the top of the same. It is pointed out that the fan provides a constant circulation of the air which the heating unit hereinbefore described, holds at a constant temperature.

To properly condition fruits and vegetables, it has been found necessary to subject them to a gas which hastens or retards their ripening and coloring. Different kinds of gas have been used with different results obtained. Experiments have shown that ethylene gas has produced very good results, but it is here pointed out that the apparatus may be used with any gas suitable for the purpose. The conditioning gas is stored in a suitable container 23 which is mounted on the rear wall of the cabinet near the upper end thereof. The upper end of the container has an outlet pipe 24, the end of which is positioned adjacent the open, upper end of the cabinet. A valve 25 is connected in the pipe 24 and controls the gas escaping from the container. It is obvious that by closing the switch 18, the heating strips 15 are energized and the heat of the air within the enclosure is brought up to a proper temperature. The fan is turned on to draw the air downwardly thru the cabinet and force it outwardly onto the floor thru the opening 12. The valve 25 in the outlet pipe 24 is opened releasing the gas from the container. Since the end of the pipe 24 is adjacent the open upper end of the cabinet, the fan draws the gas escaping therefrom, downwardly with the air thru the cabinet, and forces the mixture outwardly thru the opening 12 onto the floor of the enclosure. The gas, being lighter than air will rise upwardly in the enclosure thereby engaging the fruit or vegetable therein.

Some fruits and vegetables require that sufficient humidity of the air in the enclosure or room be maintained. If the humidity is too low, the material under treatment will show a distinct loss in weight and the skins will become shrivelled and broken. To control the humidity of the air in the room, steam is mixed with the air which is forced thru the cabinet by the fan.

In providing the steam, a generator 26 is mounted within the cabinet between the heating strips at the lower end thereof. The generator includes a casing 27 in which an electric heating element 28 is mounted. The element is energized by wires 28a in which a control switch 29 is connected. The switch is mounted in the switch panel 18' on the front of the panel. A pipe 30 has one end passing thru the bottom of the casing and is provided with a float valve 31 which is opened and closed by the usual float ball 32. The other end of the pipe 30 has connection with the lower end of a suitable water container or tank 33 which is mounted on the rear wall of the cabinet. A control valve 34 is connected in the pipe 30. It is clear that the float valve will keep a constant water level in the casing and when the electric heating element 28 is energized steam is generated. The steam is conducted from the casing 27 to the atmosphere by an outlet pipe 33'.

At times it is desirable to spray the particular fruit or vegetable with cold water and for this purpose a spray nozzle 35 having connection with a supply line 36 is provided. The nozzle is positioned in the opening 12 at the front of the cabinet, so that when a valve 36' in the supply line is opened, a fine spray of cold water is directed onto the fruit or vegetable in the enclosure.

Figure 3:
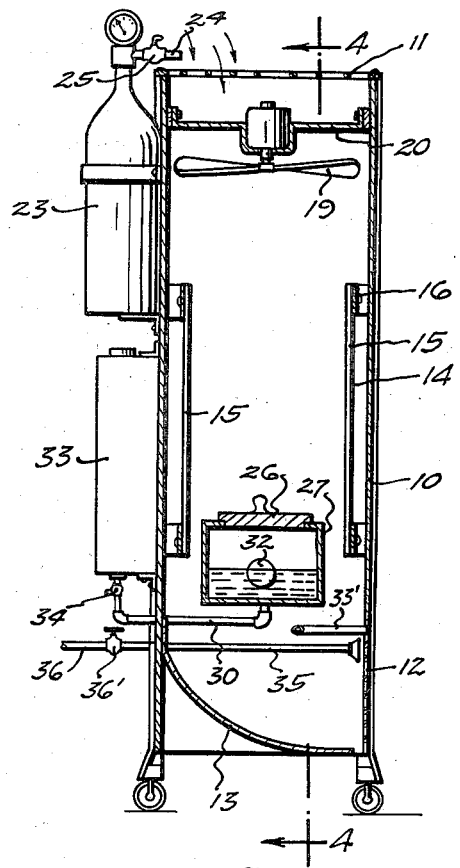
Figure 3 is a transverse vertical sectional view, taken on the line 3—3 of Figure 1.
Figure 2:
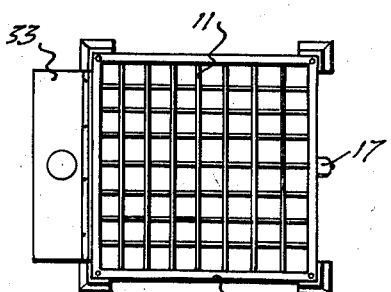
Figure 2 is a plan view of the same.
Figure 6:
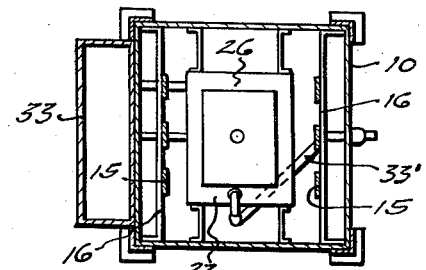
Figure 6 is a horizontal cross sectional view, taken on the line 6—6 of Figure 1.

In Figures 9 to 17, I have shown another form of the invention. In this form, the heating strips 15, instead of being mounted vertically as shown in Fig. 3, are positioned at an angle within the cabinet. The upper end of the strips have a transverse supporting rod 15' extending therethrough. The rod is positioned centrally within the cabinet and the lower ends of the strips are angled to extend forwardly and rearwardly of said rod, said lower ends having transverse supporting rods 16' extending therethrough. Electrical bus bars 40 connect the heating strips and electrical current is supplied to one of the bus bars by the lead wire 15a. The wire 15b is connected with the thermostat 17. The control of the energizing of the heating strips is accomplished in the same way as in the form shown in Figures 1 to 9 and a description of the same would be repetition. By mounting the strips at an angle within the body, it is pointed out that more space is covered and the air passing downwardly thru the cabinet must contact the strips and pass therearound, whereby more efficient and quicker heating of the air is had.

To eliminate the necessity of providing the separate gas container 23, as shown in the first form, I provide in my second form, a combination steam and gas generator 41 which is substituted for the steam generator 26. The generator 41 comprises a cylindrical container or casing 42 which has an electrical heating coil 43 mounted centrally therein. Radial partitions 44 are secured within the container and divide the container into a steam chamber 45 and a gas chamber 46. The steam chamber has the pipe 30 which leads from the water tank connected in its bottom and it is obvious that water is supplied to said chamber thereby. A pipe 47 has one end connected in the bottom of the gas chamber 46 and has its other end secured to the lower end of a liquid gas container 48 which is mounted on the inner front wall of the cabinet 10 (Figure 10). A suitable control valve 49 is connected in the pipe 47 to control the flow therethrough.

The gas for conditioning fruits and vegetables is produced by the pyrosynthesis of a hydro-carbon liquid in the electrical generator 41. Pentane has been found to give very satisfactory results, but it is pointed out that other hydrocarbon liquids and hydrocarbon mixtures may be employed. Pentane is readily obtainable, easily handled, and produces but little degenerate carbon during pyrosynthesis, so for purposes of description this hydrocarbon liquid will be used throughout the specification, altho it is to be remembered that the invention is not to be limited to pentane.

The pentane is stored in the container 48 and when it is desired to produce gas, the control valve 34 in the water line 30 is closed and the valve 49 in the pentane supply line 47 is opened. The pentane then flows from the container 48 into the chamber 46 of the generator 41. The electrical coil, which is supplied with electrical current by the wires 28a and controlled by the switch 29 is energized. The heating of the pentane generates a gas suitable for conditioning the fruits and vegetables. The gas rising within the chamber 46 escapes therefrom thru a pipe 50 which has its upper end connected with one end of a cylindrical mixing chamber 51 which is mounted above the generator. The gas after entering the mixing chamber is conducted to the atmosphere by an outlet pipe 52 which terminates in the upper end of the opening 12 in the front wall of the cabinet 10.

The other end of the mixing chamber 51 is connected by a pipe 53 with the upper end of the steam chamber 45 of the generator. When it is desired to generate steam, the liquid gas valve 49 is closed and the water control valve 34 is opened. The water then flows into the chamber 45 where it is heated by the coil 43 and steam is generated. The steam passes upwardly into the mixing chamber 51 and escapes therefrom thru the outlet pipe 52. Thus, it is obvious that the generator serves as both a steam and gas generator. At times, it might be desired to generate both at the same time and it is clear that this is possible, for in such a case the generated gas and steam will admix within the mixing chamber and the mixture of both will then escape thru the outlet pipe 52.

It is pointed out that the construction of the cabinet is similar in both forms, the only difference being in the position of the heating strips. In the second form, the combination generator 41 is substituted for the steam generator 26, and by providing such combination generator the necessity of the user buying the gas already stored in tanks is eliminated.

In both forms the operation is similar. The fruit or vegetable to be conditioned or treated is placed in a substantially air tight room or enclosure wherein the cabinet 10 is positioned. The fan 19 is turned on to draw in thru the top of the cabinet and force it downwardly through and around the metal heating strips 16 and out of the opening 12 at the lower front wall of said cabinet. This sets up a circulation of air within the room. The thermostat 17 is then set at the desired temperature and the switch 18 is closed or turned to its "on" position. This closes the electrical circuit to the heating strips 16 and the room is then heated to the desired temperature. During this time the fan is operating to circulate the heated air.

If it is desirable, depending on the particular fruit or vegetable, to raise the humidity of the air in the room, the switch 29 is closed to energize either the element 28, in the first form, or the coil 43 in the second form. The water valve 34 is then opened and water flows into the generator (in the second form, the valve 49 controlling the flow of pentane is closed). The steam thus generated escapes into the atmosphere as has been described. The water control valve 34 is left open until the desired saturation is reached, which may be ascertained by a hygrometer (not shown), after which time said valve is closed.

To release the gas in the first form, it is only necessary to open the valve 25 and the gas escaping from the container 23 is drawn downwardly thru the cabinet by the fan 19. In the second form, the liquid gas valve 49 is opened and the pentane flows into the generator 41 where a suitable conditioning gas is generated. The generated gas escapes into the atmosphere thru the outlet pipe 52. The length of time that the gas is being discharged depends entirely on the particular fruit or vegetable which is being treated. For instance bananas are treated under more difficult conditions than celery or citrus fruits. Each fruit or vegetable, however, must have a certain constant temperature and humidity and must be subjected to a certain gas concentration to be properly treated and conditioned.

In both forms shown, a positive control of these conditions is had. After a particular fruit or vegetable has been treated, the fan 19 can be reversed and a duct (not shown) placed over the upper end of the cabinet to draw the gas from the room. Altho I have described pentane as used in the form shown in Figures 10 to 17, it is again brought out that any hydrocarbon liquid or mixture, such as hexane can be used if the proper conditions for their pyrosynthesis is maintained.

The description which has been given recites more or less detail of a particular embodiment of the invention, which is set forth as new and useful; however, I desire it understood that the invention is not limited to such exact details of construction, because it is manifest that changes and modifications may be made, within the scope of the appended claims, without departing from the spirit of the invention.

What I claim and desire to secure by Letters Patent, is:

1. A self-contained apparatus for conditioning fruit and vegetables stored within an enclosure including, a portable cabinet having an air passage throughout its length and open at its opposite ends, means for forcing air through the passage and out through an end opening thereof, a heater disposed in the passage for heating the air passing therethrough, a manually regulatable external thermostat connected with the heating means for maintaining a constant predetermined temperature of the heater, a water tank mounted on the cabinet, a liquid gas tank mounted on the cabinet, a generator disposed in the air passage of the cabinet and connected to both tanks for generating steam and gas, respectively, means controlling the supply of water and liquid gas, at will, to generate steam and gas simultaneously or either steam or gas alone, and means for releasing the products generated in the generator into the air stream.

2. In a self-contained apparatus for conditioning fruits and vegetables, as herein described, a portable cabinet having a vertical air passage therethrough and open at its top and bottom, means for forcibly circulating air through the passage and out through an end opening thereof, means for heating the air passing through said passage, said means comprising a series of spaced longitudinally extending elongated heating elements, said elements being arranged inclinedly across said passageway in upwardly convergent relation from opposite sides of the cabinet whereby the air passing through said passage moves lengthwise of said heating elements and between the same, a combined steam and gas generator within said passage below and in proximity to said heating elements, said generator comprising a hollow shell having a central heating chamber and separate gas and steam generating chambers, the wall of said heating chamber constituting portions of the walls of said gas and steam generating chambers, a mixing chamber above and communicable with said gas and steam generating chambers, a pipe connection from said mixing chamber arranged to discharge into the air stream from said air passage the products of said gas and steam generating chambers, a water tank on said cabinet for supplying water to said steam generating chamber, a liquid gas tank on said cabinet for supplying such liquid to the gas generating chamber, an electrical heating element within said central heating chamber of the generator, manually operable means for controlling the supply from said water tank and said liquid gas tank to the generator whereby to supply either alone or both conjointly to the generator, at will, manually operable means for energizing the respective electrical elements of the apparatus and a thermostat exposed to the atmosphere externally of the cabinet for automatically controlling said electrical elements during operation.

WALKER E. SIMONSON.